United States Patent
Yeh

(10) Patent No.: US 9,609,450 B2
(45) Date of Patent: Mar. 28, 2017

(54) METHOD AND SYSTEM FOR MONITORING SPEAKER TEMPERATURE FOR SPEAKER PROTECTION

(71) Applicant: Apple Inc., Cupertino, CA (US)

(72) Inventor: David T. Yeh, Redwood City, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/732,498

(22) Filed: Jun. 5, 2015

(65) Prior Publication Data

US 2016/0360331 A1 Dec. 8, 2016

(51) Int. Cl.
| | |
|---|---|
| *H04R 29/00* | (2006.01) |
| *H04R 3/00* | (2006.01) |
| *H04R 3/04* | (2006.01) |
| *G01K 7/16* | (2006.01) |

(52) U.S. Cl.
CPC ............ *H04R 29/003* (2013.01); *G01K 7/16* (2013.01); *H04R 3/007* (2013.01); *H04R 3/04* (2013.01)

(58) Field of Classification Search
CPC ...... H04R 29/001; H04R 29/003; H04R 3/00; H04R 3/04; H04R 3/007; H04R 23/002; H04R 2430/00; H04R 2430/01; H04R 5/04; H04R 2209/022; H04R 2209/041; H04R 9/06; G01K 7/16; G01K 7/427
See application file for complete search history.

(56) References Cited

U.S. PATENT DOCUMENTS

| | | | |
|---|---|---|---|
| 9,014,384 B2 | 4/2015 | Gautama | |
| 2011/0194705 A1* | 8/2011 | Gautama | H03F 1/30 381/59 |
| 2012/0020488 A1* | 1/2012 | Huijser | H04R 3/007 381/59 |
| 2012/0328117 A1 | 12/2012 | Gautama | |
| 2014/0126730 A1* | 5/2014 | Crawley | H04R 29/001 381/59 |
| 2014/0169571 A1 | 6/2014 | Polleros | |
| 2015/0078569 A1* | 3/2015 | Magrath | G10K 11/178 381/71.1 |
| 2015/0200638 A1* | 7/2015 | Ko | H03G 3/3005 381/104 |
| 2015/0215704 A1* | 7/2015 | Magrath | H04R 9/022 381/55 |
| 2016/0182998 A1* | 6/2016 | Galal | H04R 3/007 381/55 |

FOREIGN PATENT DOCUMENTS

EP 2806656 A1 11/2014

* cited by examiner

*Primary Examiner* — Thang Tran
(74) *Attorney, Agent, or Firm* — Blakely, Sokoloff, Taylor & Zafman LLP

(57) ABSTRACT

A method of monitoring speaker temperature for speaker protection starts by generating a low level inaudible noise signal and injecting the low level inaudible noise signal in an audio signal. The voice coil resistance estimate that estimates a resistance of a voice coil of a speaker is then computed. The voice coil resistance estimate changes while the speaker is being driven by the audio signal that includes the low level inaudible noise signal. The temperature estimate is then computed based on the voice coil resistance estimate. The level of the audio signal may be adjusted based on the temperature estimate. Other embodiments are also described.

23 Claims, 8 Drawing Sheets

METHOD AND SYSTEM FOR MONITORING SPEAKER TEMPERATURE FOR SPEAKER PROTECTION

FIELD

An embodiment of the invention relate generally to a system and a method for monitoring speaker temperature for speaker protection. Specifically, the system and method monitors speaker temperature by injecting a band-limited noise signal into the audio path and processing the measured voltage and current signals of the speaker to determine the resistance estimate of the voice coil which is then converted to the temperature of the voice coil.

BACKGROUND

Currently, a number of consumer electronic devices include internal speakers and are adapted to output audio signals including speech and music via speaker ports. An internal speaker comprises a speaker box and a speaker driver. The speaker box is an acoustic chamber that includes the speaker port and at least partially encloses a speaker driver. The speaker driver includes a diaphragm, a voice coil, a magnet unit and a yoke.

For audio to be played, current is applied to the speaker driver which causes the voice coil to generate heat. The voice coil in the speaker driver is coupled to the magnet unit and thus, the heat from the voice coil is transferred to the magnet unit. The amount of power that may be applied to the speaker box is limited by the resilience of the magnet unit to heat. Overheating any magnet will cause structural or mechanical damage to the magnet and may result in its demagnetization. Accordingly, the temperature of the voice coil needs to be monitored to ensure that the integrity of the speaker is maintained.

SUMMARY

Generally, the invention relates to a system and a method for monitoring speaker temperature for speaker protection. To determine the temperature of the voice coil of the speaker, a low level inaudible noise signal is injected into the audio path and mixed with the primary audio signal. The low level inaudible noise signal allows for measurements the voltage and current signals of the speaker which are used to determine the resistance estimate of the voice coil. This may further be converted to a temperature estimate via a temperature coefficient equation of voice coil materials. Using this temperature estimate, the output levels of the speaker may be maintained within safe limits.

In one embodiment of the invention, a method of monitoring speaker temperature for speaker protection starts by generating a low level inaudible noise signal and injecting the low level inaudible noise signal in an audio signal. The voice coil resistance estimate that estimates a resistance of a voice coil of a speaker is then computed. The voice coil resistance estimate changes while the speaker is being driven by the audio signal that includes the low level inaudible noise signal. A temperature estimate may then be computed based on the voice coil resistance estimate.

In one embodiment, a computer-readable storage medium having stored thereon instructions, which when executed by a processor, causes the processor to perform the method of monitoring speaker temperature for speaker protection.

In another embodiment, a system of monitoring speaker temperature for speaker protection comprises a limiter, a pilot noise generator, a speaker including a voice coil, and a temperature measurer. The limiter receives an audio signal and adjusts a level of the audio signal based on a temperature estimate. The pilot noise generator generates a low level inaudible noise signal that is injected in the audio signal. The speaker outputs the audio signal including the low level inaudible noise signal. The temperature measurer computes a voice coil resistance estimate that estimates a resistance of the voice coil and the temperature estimate based on the voice coil resistance estimate. The voice coil resistance estimate changes while the speaker is being driven by the audio signal that includes the low level inaudible noise signal.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
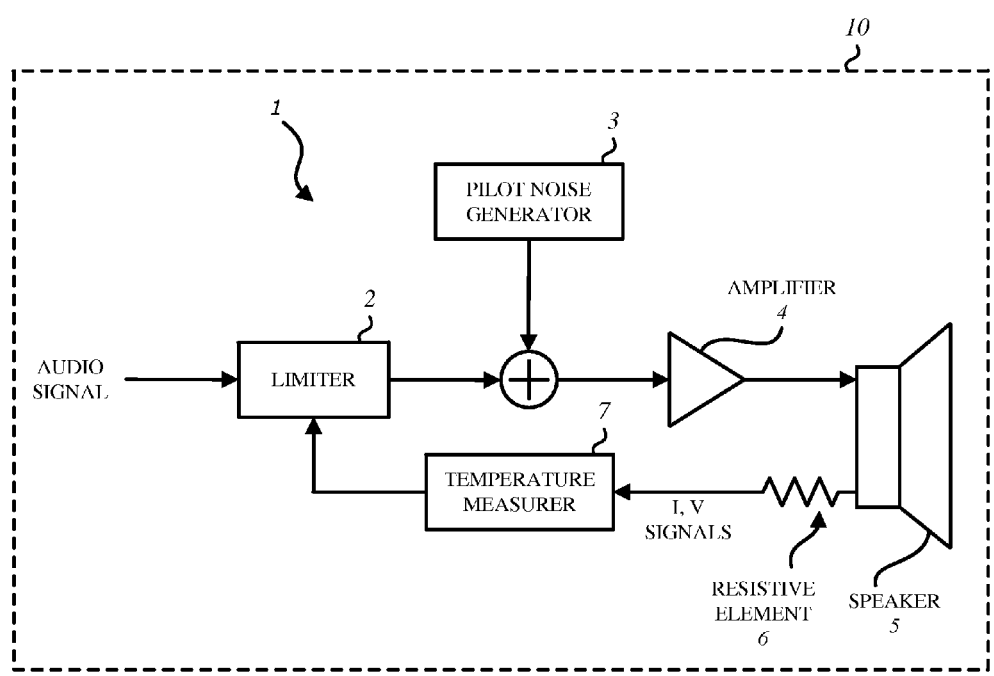
FIG. 1 illustrates a block diagram of an electronic device in which a system for monitoring speaker temperature for speaker protection according to one embodiment of the invention may be implemented.

FIG. 1 illustrates a block diagram of an electronic device 10 in which a system 1 for monitoring speaker temperature for speaker protection according to one embodiment of the invention may be implemented.

The electronic device 10 may be constrained in size and thickness and typically specifies speaker drivers in which an embodiment of the invention may be implemented. The electronic device 10 may be a mobile device such as a mobile telephone communications device or a smartphone. The electronic device 10 may also be a tablet computer, a personal digital media player or a notebook computer. The housing (also referred to as the external housing) encloses a plurality of electronic components of the electronic device 10. For example, the electronic device 10 may include electronic components such as a processor, a data storage containing an operating system and application software for execution by the processor, a display panel, and an audio codec providing audio signals to a speaker driver. The device housing has a speaker port (e.g., an acoustic port not shown). It is understood that embodiments of the invention may also be implemented in a non-mobile device such as a compact desktop computer.

As shown in FIG. 1, the system 1 for monitoring speaker temperature includes a limiter 2, a pilot noise generator 3, an amplifier 4, a speaker 5, a resistance element 6, and a temperature measurer 7.

The system 1 monitors the temperature of the voice coil included in the speaker 5 while the speaker 5 (e.g., a dynamic loudspeaker) is being driven by an audio signal that is also referred to as the primary audio. In some embodiments, the speaker 5 may be a microspeaker used for mobile devices 10. The audio signal may be include voice, speech, sound effects, etc. For instance, the electronic device 10 may be adapted to receive transmissions from any content provider. An example of a "content provider" may include a company providing content for download over the Internet or other Internet Protocol (IP) based networks like an Internet service provider. In addition, the transmissions from the content providers may be a stream of digital content that is configured for transmission to one or more digital devices for viewing and/or listening. According to one embodiment, the transmission may contain MPEG (Moving Pictures Expert Group) compliant compressed video. The electronic device may also be coupled to a digital media player (e.g., DVD player) to receive and display the digital content for viewing and/or listening. Accordingly, when the user is using the electronic device 10 to listen to audio content or to view audio-visual content, the audio signal includes the audio content or the audio portion of the audio-visual content and the sound corresponding to the audio signal may be output by the speaker 5 from the speaker ports of the device 10.

In another embodiment, the electronic device 10 includes wireless communications devices having communications circuitry such as radio frequency (RF) transceiver circuitry, antennas, etc. . . . . In this embodiment, the microphone port, the speaker ports may be coupled to the communications circuitry to enable the user to participate in wireless telephone or video calls. A variety of different wireless communications networks and protocols may be supported in the wireless communications devices. These include: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN) which may also support wireless voice over internet protocol (VOIP) calling. In one embodiment, the audio signal received by the system 1 includes voice signals that capture the user's speech (e.g., near-end speaker) or voice signals from the far-end speaker.

Referring back to FIG. 1, the audio signal is received by the limiter 2 which may adjust the level of the audio signal based on a temperature estimate received from the temperature measurer 7. In order to obtain the temperature estimate, the pilot noise generator 3 generates a low level inaudible noise signal that is injected in the audio signal. In other words, the low level inaudible noise signal is mixed with the primary audio. As shown in FIG. 1, the audio signal that includes the low level inaudible noise signal is amplified by the amplifier 4 and is outputted by the speaker 5. The low level inaudible noise signal provides excitation to the speaker 5 which generates a measurable voltage signal and current signal of the speaker 5. In one embodiment, the voice coil in the speaker 5 is monitored with analog-to-digital converters for voltage across the terminals of speaker 5 and for current through the terminal of speaker 5. Using these signals from the speaker 5, the low band impedance of the voice coil (e.g., voice coil resistance estimate) may be identified and converted to obtain an estimate of the temperature of the voice coil. In one embodiment, the low level inaudible noise signal is inaudible due to the second order high pass nature of the speaker 5. As shown in FIG. 1, the temperature measurer 7 computes the voice coil resistance estimate that estimates a resistance of the voice coil and the temperature estimate based on the voice coil resistance estimate. This voice coil resistance estimate changes while the speaker 5 is being driven by the audio signal that includes the low level inaudible noise signal. As further shown in FIG. 1, a resistance element 6 (e.g., resistor) may be coupled to the speaker 5 and the temperature measurer 7.

Figure 8:
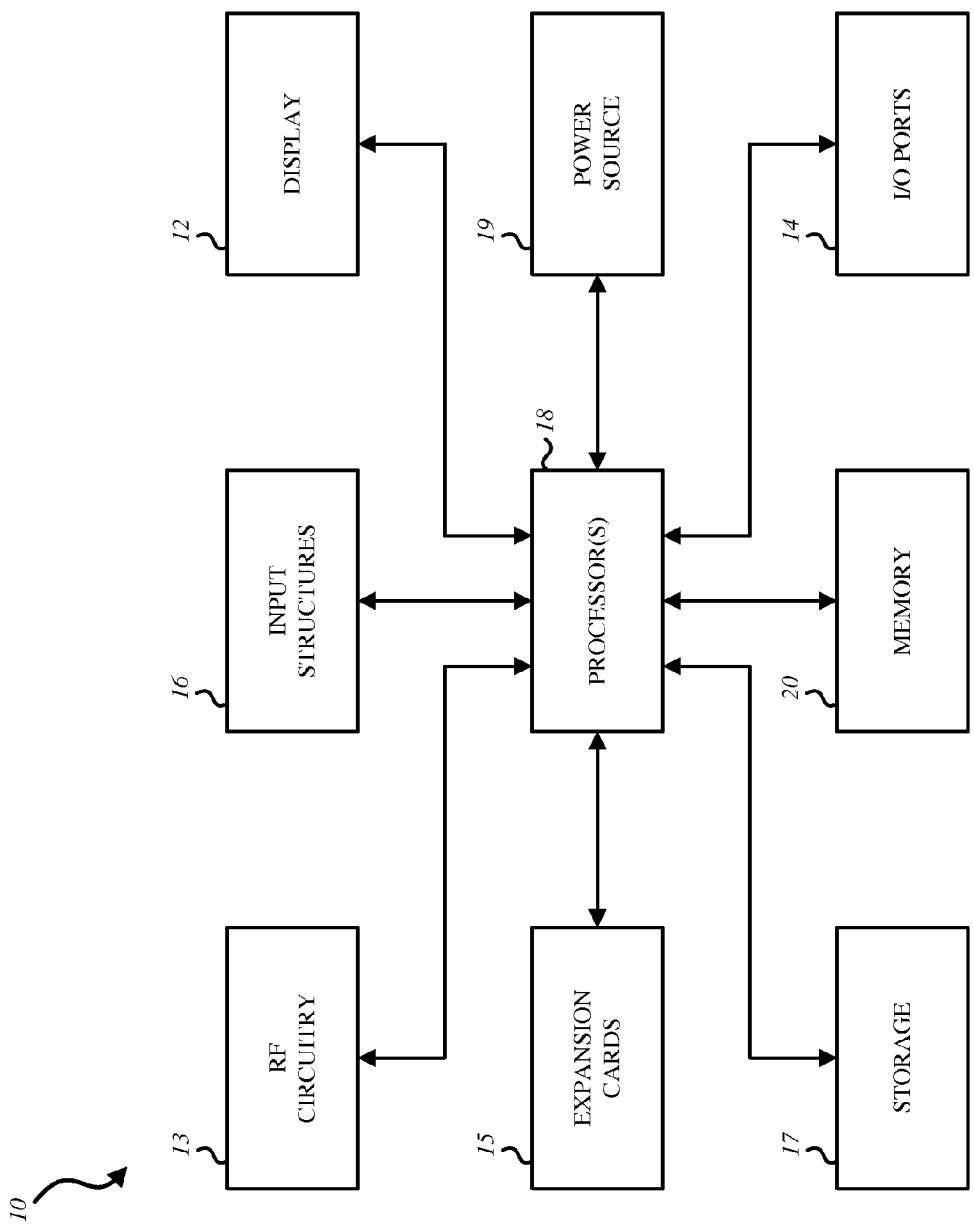
FIG. 8 is a block diagram of exemplary components of an electronic device in which the system for monitoring speaker temperature for speaker protection may be implemented in accordance with aspects of the present disclosure.

In one embodiment, system 1 is coupled to processing circuitry and storage that is included in electronic device 10 as discussed in FIG. 8. The processing circuitry included in device 10 may include a processor 18, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing circuitry may be used to control the operations of device 10 by executing software instructions or code stored in the storage 17. The storage 17 may include one or more different types of storage such as hard disk drive storage, nonvolatile memory 20, and volatile memory 20 such as dynamic random access memory. In some cases, a particular function as described below may be implemented as two or more pieces of software in the storage 17 that are being executed by different hardware units of a processor. The processing circuitry may execute instructions stored in memory that causes the processing circuitry to perform the method of monitoring speaker temperature according to the embodiments as described herein. The processing circuitry may also execute instructions stored in memory that causes the processing circuitry to control the functions of each of the components of system 1 to cause the components (e.g., the limiter 2, pilot noise generator 3, temperature measurer 7, etc.) to perform the functions according to the embodiments as described herein.

Figure 2:
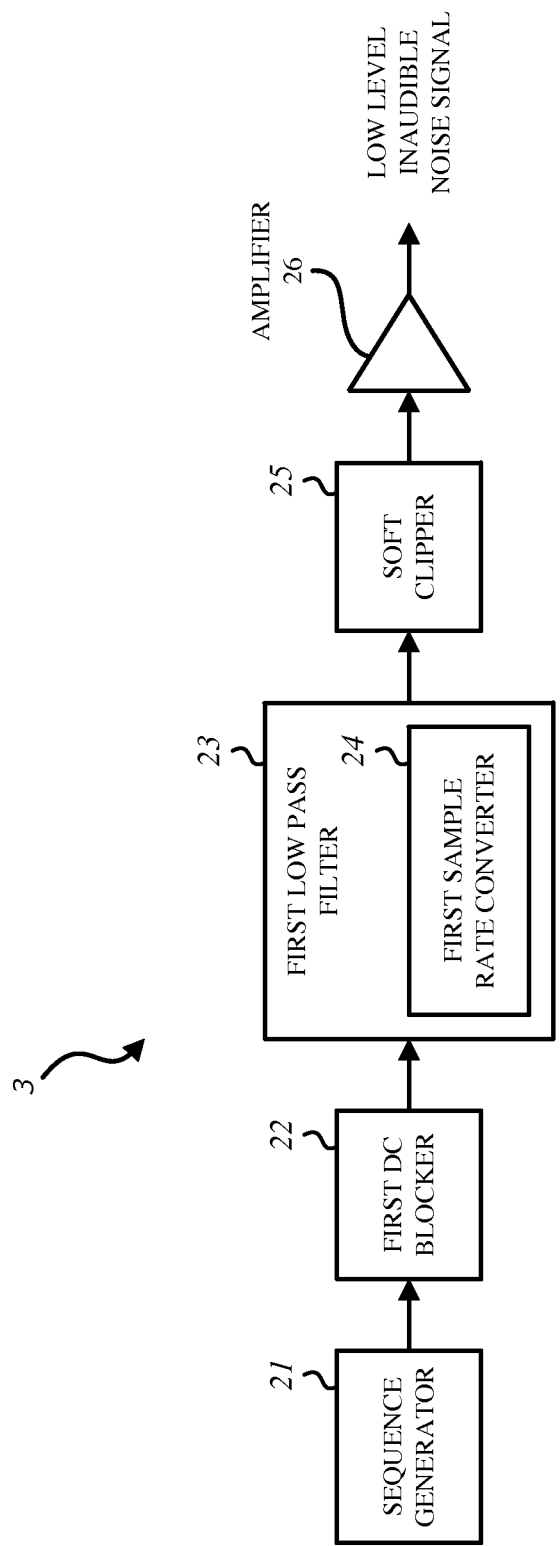
FIG. 2 a block diagram of the details of the pilot noise generator that is included in the system in FIG. 1 according to one embodiment of the invention.

FIG. 2 a block diagram of the details of the pilot noise generator 3 that is included in the system in FIG. 1 according to one embodiment of the invention. The pilot noise generator 3 may include a sequence generator 21, a first DC blocker 22, a first low pass filter 23 that includes a first sample rate converter 24, a soft clipper 25, and an amplifier 26.

In one embodiment, the sequence generator 21 generates a noise signal that is a Maximal Length Sequence (MLS). The sequence generator 21 may be a linear feedback shift register (LFSR). In another embodiment, the sequence generator 21 may generate a multi-tone signal. The first DC blocker 22 receives the noise signal (e.g., MLS or multi-tone signal) from the sequence generator 21 and blocks the DC offset included in the noise signal to output a DC blocked noise signal. The first low pass filter 23 may then receive and filter the DC blocked noise signal to an inaudible band. The first low pass filter 23 may be a finite impulse response (FIR) filter or an Infinite Impulse Response (IIR) filter. In one embodiment, the first low pass filter 23 includes a first sample rate converter 24 that converts a sample rate from a first sample rate to a second sample rate. The first sample rate may be the noise signal sample rate (e.g., 100 Hz) and the second sample rate may be higher (e.g., 48 kHz). In one embodiment, the first low pass filter 23 is a multirate FIR low pass filter with a cutoff frequency of 40 Hz and using a Kaiser window filter design. In one embodiment, the first low pass filter is an FIR filter that converts between the sample rates. The FIR filter may be a tapped delay line filter in this embodiment. In another embodiment, the first low pass filter 23 is an IIR filter that includes a first sample rate converter 24 to further perform downsampling. In some embodiments, the first sample rate converter 24 may be included in the pilot noise generator 3 but separate from the first low pass filter 23.

The soft clipper 25 soft clips the output of the first low pass filter 23 to limit a crest factor. The soft clipper 25 may implement a hyperbolic tangent (tan h) function or other similarly shaped functions. The soft clipper 25 generates a softclipped output, which is received and amplified by the amplifier 26. The output of the amplifier 26 is the low level inaudible noise signal. The amplifier 26 may amplify the softclipped output to a level between −40 dBFS to −30 dBFS. At this level, the low level inaudible noise signal that is injected into the audio signal is low enough to be inaudible and preserve headroom for the audio signal that is desired and is large enough to overcome interfering signals. The inaudible band may be between 0 and 40 Hz. In one embodiment, the low level inaudible noise signal is between 0 and 40 Hz which is inaudible in the response to the range of the speaker 5.

It is contemplated that because the low frequency signal has a local DC offset temporally, the start and stop transitions of the noise are managed by fading in the low level inaudible noise signal in the presence of audio and fading out the low level inaudible noise signal in the absence of audio. The fading may be a linear fade or an exponential fade. The amplifier 26 may multiply the start of softclipped output by a smoothly increasing function and the end of the softclipped output by a smoothly decreasing function to generate a low level inaudible noise signal that may be faded in and out of the audio signal. The smoothly increasing function and the smoothly decreasing function may be linear functions or exponential functions. Once the pilot noise generator 3 generates the low level inaudible noise signal, the low level inaudible noise signal is then injected in the audio signal via the audio path as shown in FIG. 1.

In one embodiment, the pilot noise generator 3 generates the low level inaudible noise signal offline. Accordingly, rather than running the pilot noise generator 3 on the device 10, the low level inaudible noise signal is generated offline and stored in memory (or a buffer) on device 10. The device 10's processor 18 may determine when to playback the low level inaudible noise signal from the memory. In this embodiment, the first low pass filter 23 in the pilot noise generator 3 may be a long FIR filters with sharp cutoff and controlled sidelobes that is used to synthesize the low level inaudible noise signal beforehand offline. The low level inaudible noise signal may then be stored in a buffer and injected as a looped audio clip in the audio signal via the audio path as illustrated in FIG. 1. In this embodiment, the loop points may be calculated automatically by finding the zero crossings and linearly crossfading the beginning and end of loop to ensure a smooth loop transition.

In another embodiment, the pilot noise generator 3 generates the low level inaudible noise signal online. In other words, the pilot noise generator 3 is running on the device 10 and generating the low level inaudible noise signal during the playback of the audio signal by speaker 5. This online embodiment may provide more randomness to the low level inaudible noise signal. In this embodiment, the sequence generator 21 generates the noise signal (e.g., MLS) online and the first low pass filter 23 is a sharp IIR filter that filters the noise signal.

Referring back to FIG. 1, once the low level inaudible noise signal from the pilot noise generator 3 is injected in the audio signal from the limiter 2, the low level inaudible noise signal provides excitation to the speaker 5 that allows the voice coil in the speaker 5 to be monitored with analog-to-digital converters. The voltage signal and the current signal from the speaker 5 via the resistance element 6 are received in parallel by the temperature measurer 7.

Figure 3:
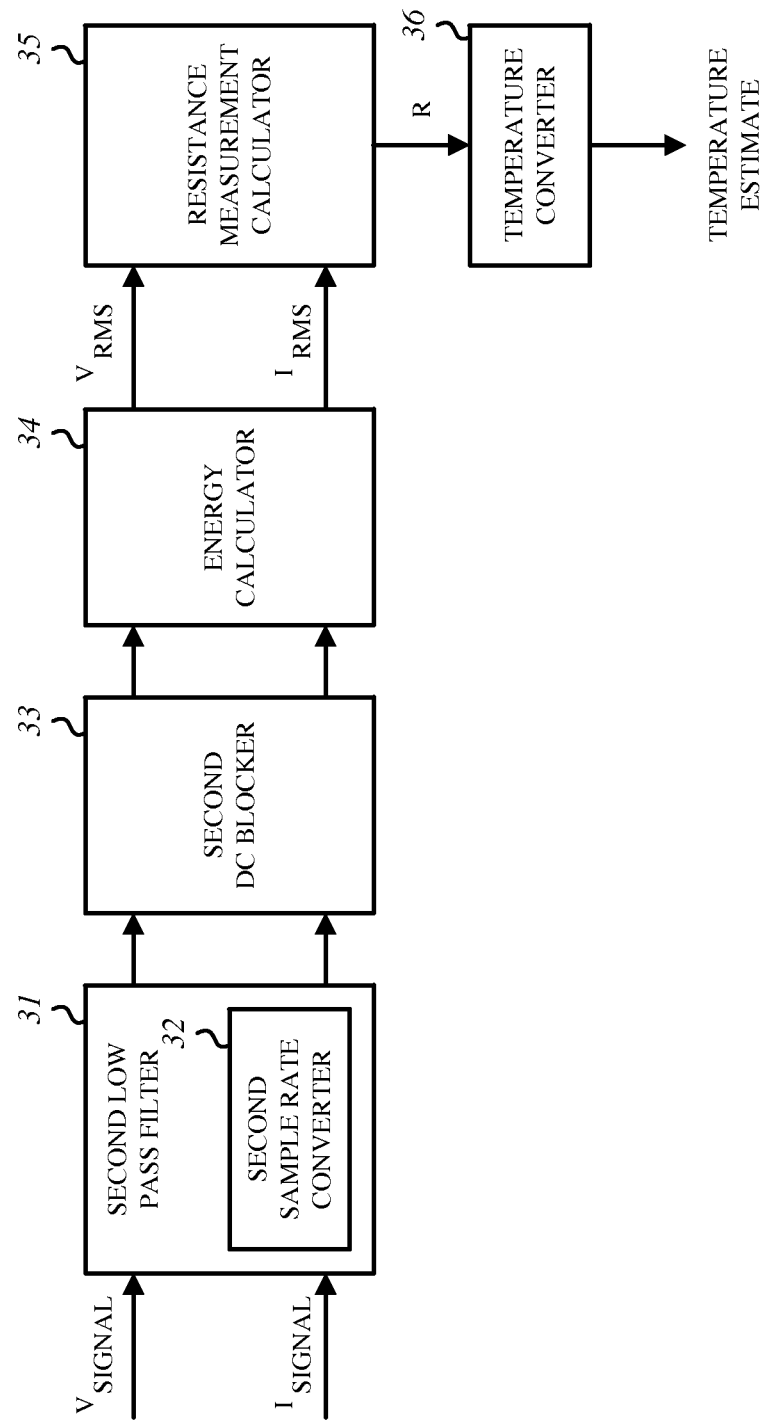
FIG. 3 a block diagram of the details of the temperature measurer that is included in the system in FIG. 1 according to one embodiment of the invention.

FIG. 3 a block diagram of the details of the temperature measurer 7 that is included in the system 1 in FIG. 1 according to one embodiment of the invention. The temperature measurer 7 comprises a second low pass filter 31, a second sample rate converter 32, a second DC blocker 33, an energy calculator 34, a resistance measurement calculator 35 and a temperature converter 36.

The second low pass filter 31 receives from the voice coil the voltage signal and the current signal in parallel and filters the voltage signal and the current signal in parallel to the inaudible band. In one embodiment, the second low pass filter 31 is a multirate low pass filter such as an FIR or an IIR with the same cutoff frequency as the first low pass filter 23 in the pilot noise generator 3. In one embodiment, the cutoff frequency is 40 Hz. Accordingly, the voltage signal the current signal are conditioned in digital signal processing (DSP) and bandpassed to the same inaudible band as the excitation signal (e.g., the low level inaudible noise signal). The second sample rate converter 32 may be included in or separate from the second low pass filter 31. The second sample rate converter 32 may perform the opposite conversion as the first sample rate converter 23 in the pilot noise generator 24. For instance, the second sample rate converter 32 may convert the sample rate from the second sample rate to the first sample rate, where the first sample rate is the noise signal sample rate (e.g., 100 Hz) and the second sample rate is higher (e.g., 48 kHz). Accordingly, the second sample rate converter 32 downsamples the low passed voltage signal and the low passed current signal. The second DC blocker 32 then receives the low pass filtered and downsampled signals in parallel and blocks a DC offset included in the low pass filtered signals in parallel. The second DC blocker 32 outputs an offset voltage signal and an offset current signal in parallel.

The energy calculator 34 may then calculate band energies for the offset voltage signal and the offset current signal in parallel. In one embodiment, energy calculator 34 calculates the band energies by calculating a root mean square (RMS) of the offset voltage signal and the offset current signal in parallel over a time window. The time window may be approximately 200 milliseconds (ms) which is short enough to track the thermal dynamics of the voice coil and long enough to filter out fluctuations. In other embodiments, the calculation of band energies may include calculating an average of all the bins of frequencies or an average of all the bands of frequencies to obtain an average band energy of the offset voltage signal ($V_{average}$) and an average band energy of the offset current signal ($I_{average}$).

The resistance measurement calculator 35 then receives the band energies of the offset voltage signal and the offset current signal and computes the voice coil resistance estimate using the band energies. For instance, the resistance measurement calculator 35 may receive the RMS of the offset voltage signal ($V_{RMS}$) and the RMS of the current signal ($I_{RMS}$) over a window. In this embodiment, the resistance measurement calculator 35 then computes the voice coil resistance estimate per time window using the received RMS values. The resistance measurement calculator 35 may compute the voice coil resistance estimate (R) using: $R=V_{RMS}/I_{RMS}$. In another embodiment, the resistance measurement calculator 35 may receive the average of all the band of frequencies and calculate the voice coil resistance estimate (R) using the average received: $R=V_{average}/I_{average}$.

The temperature converter 36 then receives the voice coil resistance estimate (R) which computes the temperature estimate of the voice coil based on the voice coil resistance estimate. In one embodiment, the voice coil resistance estimate (R or Rdc(t)) is converted into the temperature estimate using a temperature coefficient equation of voice coil materials such as:

$$Tvc=1/\alpha*(Rdc(t)/Rdc\_cal-1)+T\_cal$$

where Tvc is the voice coil temperature estimate, Rdc(t) is run time estimate of voice coil resistance, Rdc_cal is voice coil resistance calibration from factory, T_cal is voice coil temperature calibration from factory, and α is voice coil wire thermal coefficient of resistivity.

Referring back to FIG. 1, the temperature measurer 7 outputs the temperature estimate to the limiter 2 which monitors the temperature estimate and adjusts the level of the audio signal based on the temperature estimate to ensure that the output level of the speaker 5 are within safe limits. For instance, the limiter 2 may decrease the level of the audio signal when it determines that the temperature estimate is above a temperature threshold that is indicates that the temperature of the voice coil is above an acceptable limit.

While it is not illustrated in FIG. 3, in some embodiments, the voice coil resistance estimate (R) from the resistance measurement calculator 35 may be outputted to other components in the electronic device 10 (e.g., the processors 18) to be used in functions other than thermal protection. For instance, the voice coil resistance estimate (R) may be provided to the electronic device 10 as part of a calibration step (e.g., displacement protection. In this embodiment, to make use of the current signal received from the voice coil (I signal) and the voltage signal (V signal) to estimate displacement, a processor 18 may estimate the resistance and subtract the resistance's contribution from the I and V signals, and thus, the remainder is due to the mechanical motion (e.g., the electromotive force or EMF).

Further, in lieu of measuring the resistance estimate of a voice coil in a speaker 5, the embodiments described herein may be used for other electromechanical actuators such as the linear vibration motor that can be driven with arbitrary signals (e.g., vibration or haptics motors). Using the resistance estimate, embodiments of the invention may monitor the electromechanical actuator's thermal behavior or to monitor its displacement behavior via calculating the EMF as discussed above. Moreover, using the resistance measurement to monitor monitoring displacement behavior using the EMF may be applicable to any electromagnetic mechanical system.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
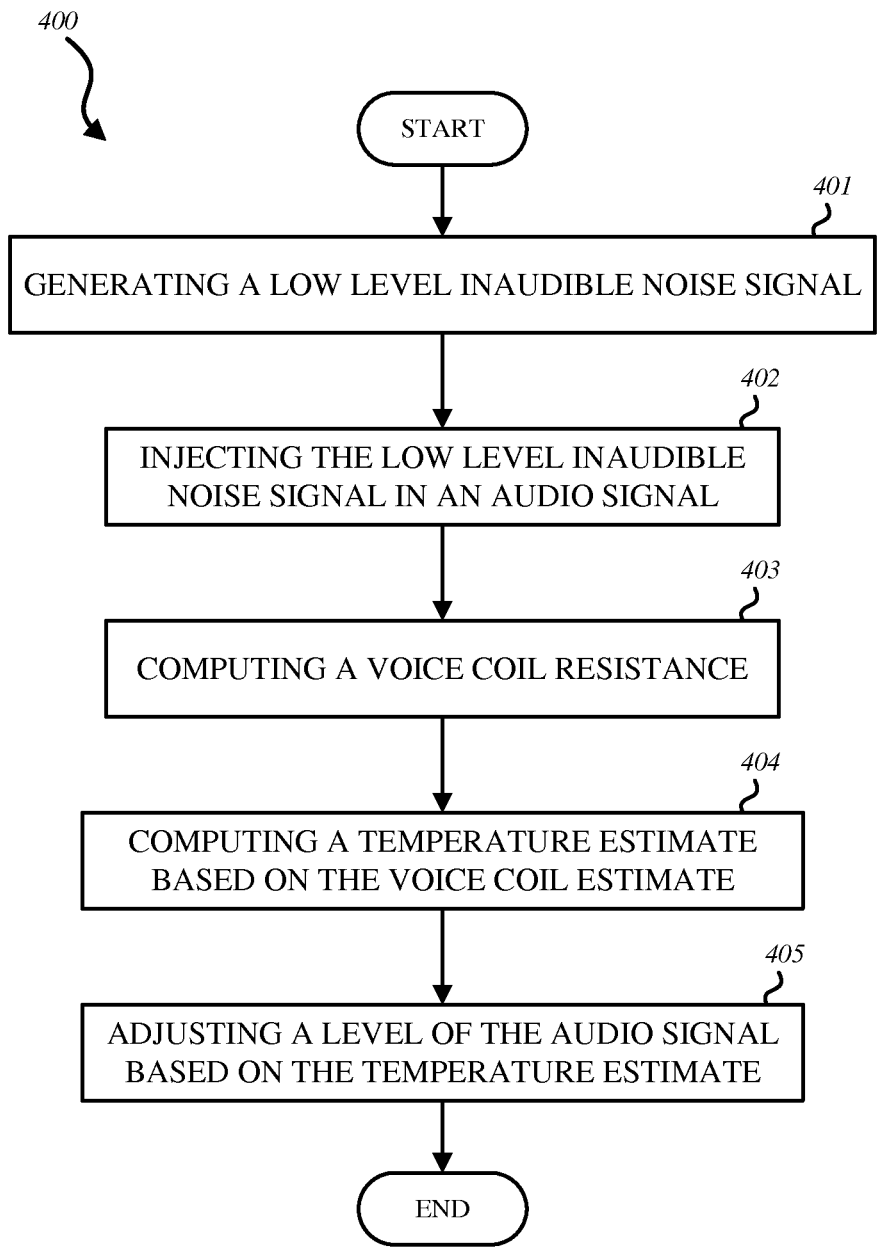
FIG. 4 illustrates a flow diagram of an example method of monitoring speaker temperature for speaker protection according to an embodiment of the invention.

FIG. 4 illustrates a flow diagram of an example method 400 of monitoring speaker temperature for speaker protection according to an embodiment of the invention. The method 400 starts by generating a low level inaudible noise signal at Block 401 and injecting the low level inaudible noise signal in an audio signal at Block 402. At Block 403, the voice coil estimate is computed which estimates a resistance of a voice coil of a speaker. The voice coil resistance estimate changes while the speaker is being driven by the audio signal that includes the low level inaudible noise signal. At Block 404, a temperature estimate based on the voice coil resistance estimate is computed. At Block 405, the level of the audio signal may be adjusted based on the temperature estimate.

Figure 5:
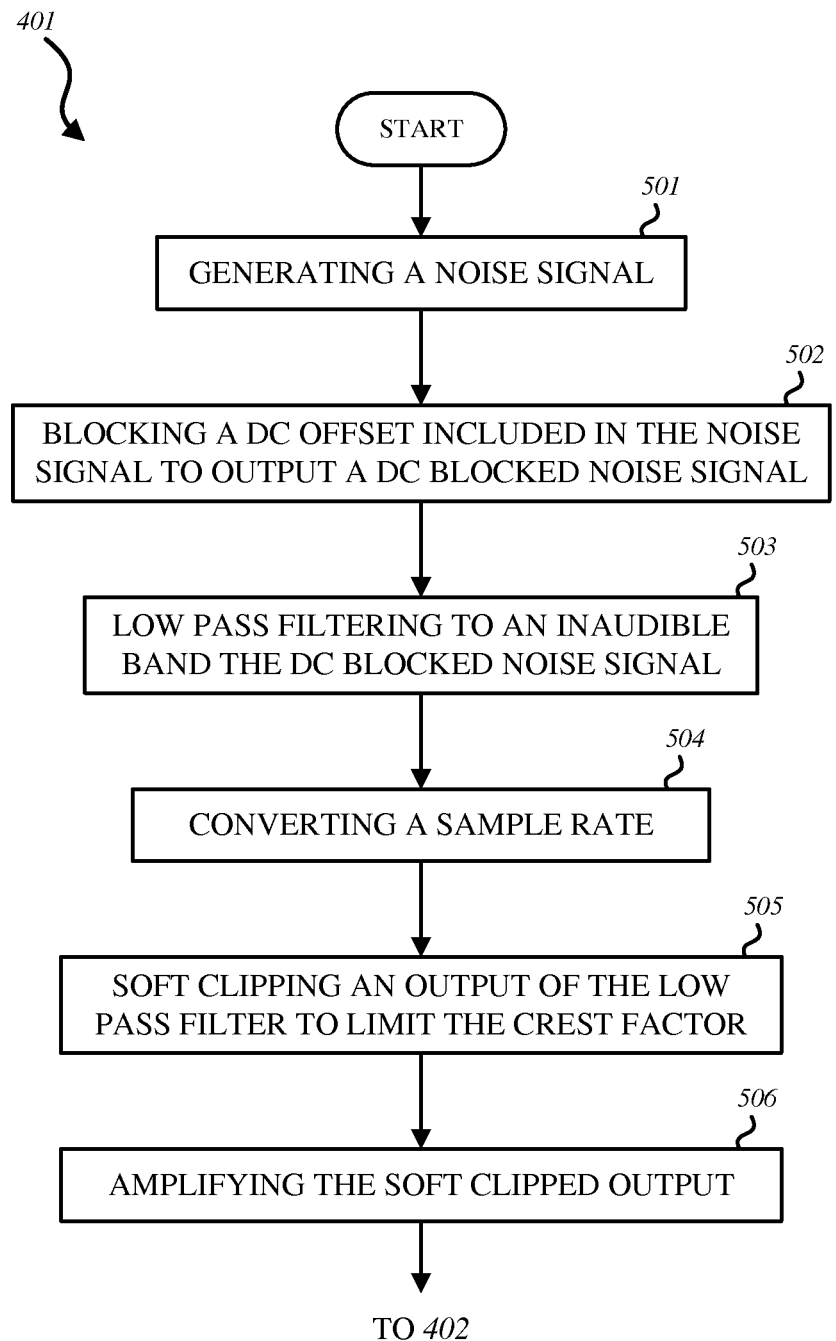
FIG. 5 illustrates a flow diagram of the details of generating a low level inaudible noise signal in Block 401 of the example method in FIG. 4 of monitoring speaker temperature for speaker protection according to an embodiment of the invention.

FIG. 5 illustrates a flow diagram of the details of generating a low level inaudible noise signal in Block 401 of the example method in FIG. 4 of monitoring speaker temperature for speaker protection according to an embodiment of the invention. The method to generate a low level inaudible noise signal starts at Block 501 by generating a noise signal. In one embodiment, the noise signal is a Maximal Length Sequence (MLS) that is generated using a linear feedback shift register (LFSR). In another embodiment, the noise signal is a multi-tone signal. At Block 502, a DC offset included in the noise signal is blocked using a first DC Blocker and a DC blocked noise signal is outputted. At Block 503, the DC blocked noise signal is low pass filtered to an inaudible band using a first low pass filter. At Block 504, a sample rate is converted from a first sample rate to a second sample rate. For instance, the sample rate of the noise signal from the LFSR and DC Blocker is the first sample rate and is converted to a higher sample rate. The sample rate conversion may be performed by a first sample rate converter included in the first low pass filter or separate from the first low pass filter. At Block 505, an output of the first low pass filter is softclipped to limit a crest factor and the softclipped output is generated and outputted to an amplifier. At Block 506, the softclipped output is amplified to generate the low level inaudible noise signal. In one embodiment, amplifying the softclipped output comprises multiplying the soft clipped output by an increasing function at a start of the soft clipped output and multiplying the softclipped output by a decreasing function at an end of the soft clipped output. The increasing function and the decreasing functions may be linear functions or exponential functions. In this embodiment, the low level inaudible noise signal may be faded in and out of the audio signal.

Figure 6:
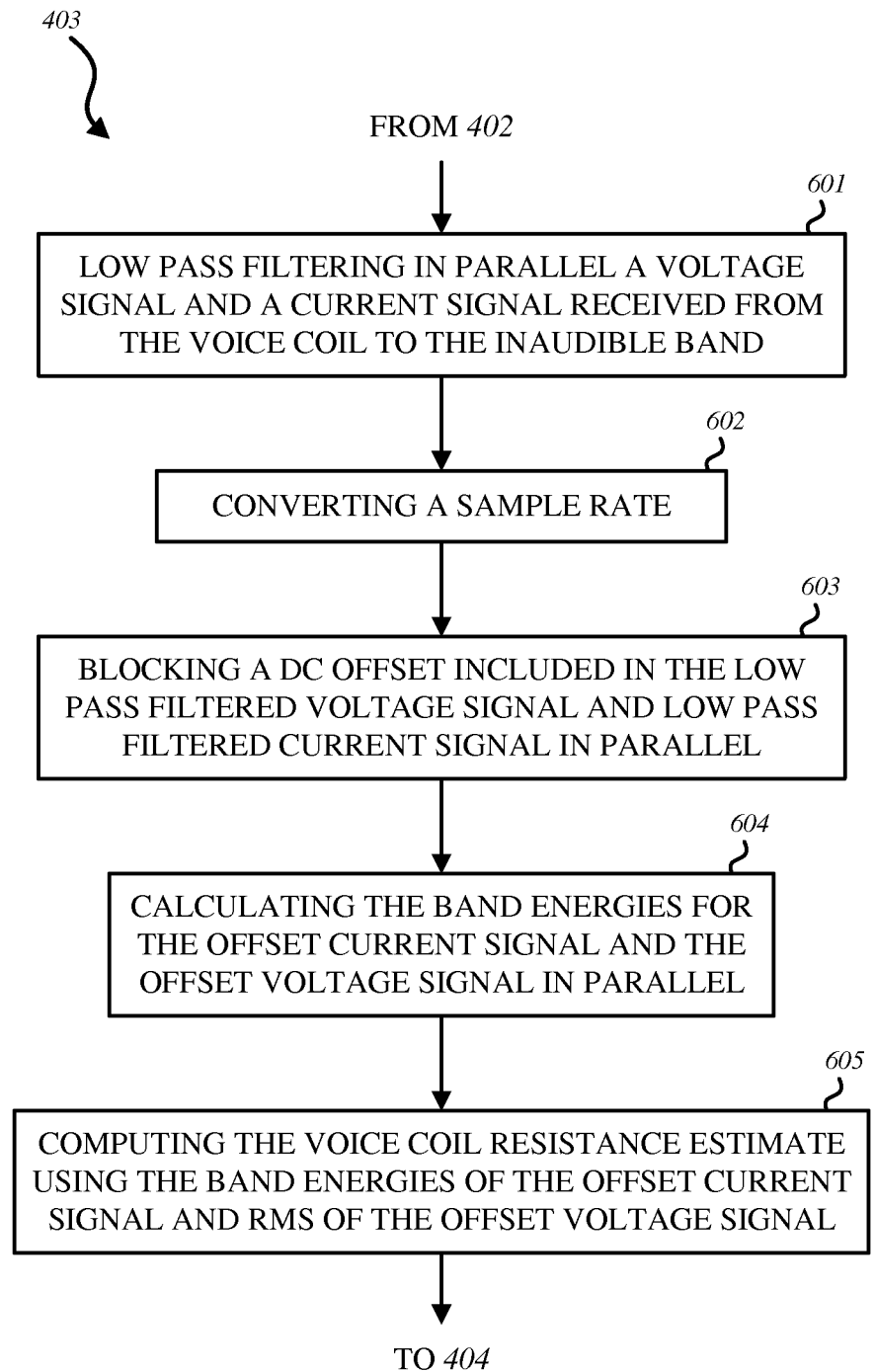
FIG. 6 illustrates a flow diagram of the details of computing the voice coil resistance in Block 403 of the example method in FIG. 4 of monitoring speaker temperature for speaker protection according to an embodiment of the invention.

FIG. 6 illustrates a flow diagram of the details of computing the voice coil resistance in Block 403 of the example method in FIG. 4 of monitoring speaker temperature for speaker protection according to an embodiment of the invention. The method to compute the voice coil resistance starts at Block 601 by low pass filtering in parallel a voltage signal and a current signal received from the voice coil to the inaudible band using a second low pass filter. At Block 602, the sample rate is converted from the second sample rate to the first sample rate. In one embodiment, the sample rate of the noise signal from the LFSR is the first sample rate. Accordingly, the higher sample rate being the second sample rate is downsampled to the sample rate of the noise signal. The sample rate conversion may be performed by a second sample rate converter included in the second low pass filter or separate from the second low pass filter. At Block 603, a DC offset included in the low pass filtered voltage and current signals are blocked in parallel to output an offset voltage signal and an offset current signal in parallel. At Block 604, the method then calculates band energies for the offset voltage signal and the offset current signal in parallel. In one embodiment, calculating band energies includes calculating a root mean square (RMS) of the offset voltage signal and the offset current signal in parallel over a time window. In other embodiments, the calculation of band energies includes calculating an average of all the bins of frequencies or an average of all the bands of frequencies to obtain an average band energy of the offset voltage signal ($V_{average}$) and an average band energy of the offset current signal ($I_{average}$). At Block 605, the voice coil resistance estimate is computed using the band energies of the offset voltage signal and offset current signal.

Figure 7:
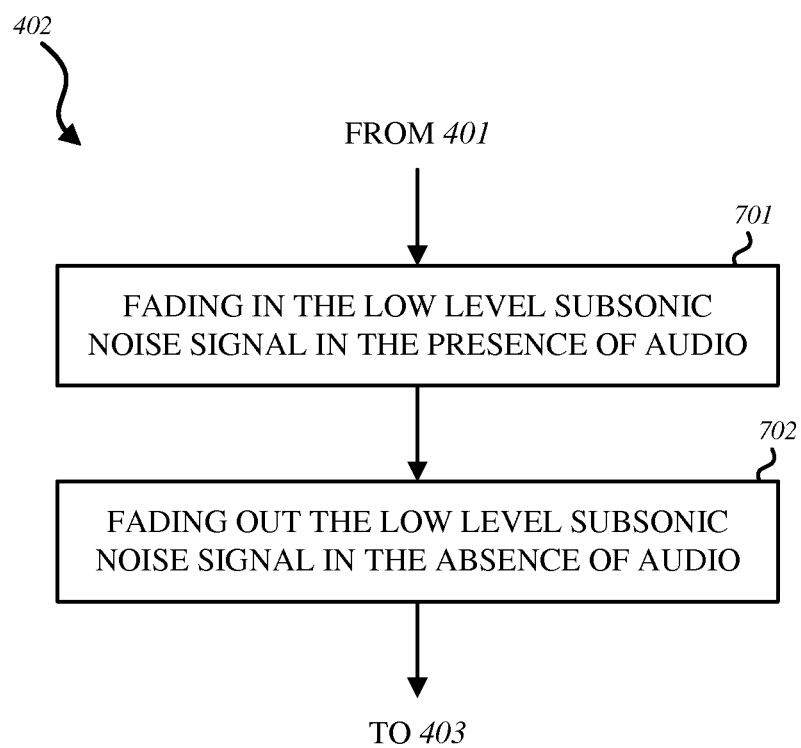
FIG. 7 illustrates a flow diagram of the details of injecting the low level inaudible noise signal in an audio signal in Block 402 of the example method in FIG. 4 of monitoring speaker temperature for speaker protection according to an embodiment of the invention.

FIG. 7 illustrates a flow diagram of the details of injecting the low level inaudible noise signal in an audio signal in Block 402 of the example method in FIG. 4 of monitoring speaker temperature for speaker protection according to an embodiment of the invention. The method of injecting the low level inaudible noise signal starts at Block 701 by fading in the low level inaudible noise signal in a presence of audio and then fading out the low level inaudible noise signal in an absence of audio at Block 702. The fading in and fading out may be performed linearly or exponentially.

FIG. 8 is a block diagram of exemplary components of an electronic device 10 in which the system 1 for monitoring speaker temperature for speaker protection may be implemented in accordance with aspects of the present disclosure. A general description of suitable electronic devices for performing these functions is provided below with respect to FIG. 8. Specifically, FIG. 8 is a block diagram depicting various components that may be present in electronic devices suitable for use with the present techniques. The electronic device 10 may be in the form of a computer, a handheld portable electronic device, and/or a computing device having a tablet-style form factor. These types of electronic devices, as well as other electronic devices providing comparable functionalities may be used in conjunction with the present techniques.

Keeping the above points in mind, FIG. 8 is a block diagram illustrating components that may be present in one such electronic device 10, and which may allow the device 10 to function in accordance with the techniques discussed herein. The various functional blocks shown in FIG. 8 may include hardware elements (including circuitry), software elements (including computer code stored on a computer-readable medium, such as a hard drive or system memory), or a combination of both hardware and software elements. It should be noted that FIG. 8 is merely one example of a particular implementation and is merely intended to illustrate the types of components that may be present in the electronic device 10. For example, in the illustrated embodiment, these components may include a display 12, input/output (I/O) ports 14, input structures 16, one or more processors 18, memory device(s) 20, non-volatile storage 17, expansion card(s) 15, RF circuitry 13, and power source 19.

In the embodiment of the electronic device 10 in the form of a computer, the embodiment include computers that are generally portable (such as laptop, notebook, tablet, and handheld computers), as well as computers that are generally used in one place (such as conventional desktop computers, workstations, and servers).

The electronic device 10 may also take the form of other types of devices, such as mobile telephones, media players, personal data organizers, handheld game platforms, cameras, and/or combinations of such devices. For instance, the device 10 may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the electronic device 10 may also be provided in the form of a portable multi-function tablet computing device. In certain embodiments, the tablet computing device may provide the functionality of media player, a web browser, a cellular phone, a gaming platform, a personal data organizer, and so forth.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components. In one embodiment, the machine-readable medium includes instructions stored thereon, which when executed by a processor, causes the processor to perform the methods as described above.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of monitoring speaker temperature for speaker protection comprising:
   generating an inaudible noise signal, wherein generating the inaudible noise signal includes: generating a noise signal, and blocking a DC offset included in the noise signal using a first DC blocker to output a DC blocked noise signal;
   injecting the inaudible noise signal in an audio signal;
   computing a voice coil resistance estimate that estimates a resistance of a voice coil of a speaker, wherein the voice coil resistance estimate changes while the speaker is being driven by the audio signal that includes the inaudible noise signal; and
   computing a temperature estimate based on the voice coil resistance estimate.

2. The method of claim 1, wherein generating the low level inaudible noise signal further comprises:
   low pass filtering to an inaudible band the DC blocked noise signal using a first low pass filter.

3. The method of claim 2, wherein generating the noise signal that is a Maximal Length Sequence (MLS) generated based on a linear feedback register, or generating the noise signal that is a multi-tone signal.

4. The method of claim 2, wherein generating the inaudible noise signal further comprises:
   converting a sample rate from a first sample rate to a second sample rate, wherein the first sample rate is a noise signal sample rate.

5. The method of claim 4, wherein generating the inaudible noise signal further comprises:
   soft clipping an output of the first low pass filter to limit a crest factor and output a softclipped output.

6. The method of claim 5, wherein generating the inaudible noise signal further comprises:
   amplifying the soft clipped output to generate the inaudible noise signal, wherein amplifying comprises multiplying the soft clipped output by an increasing function at a start of the soft clipped output and by a decreasing function at an end of the soft clipped output, the increasing function and the decreasing functions are linear or exponential.

7. The method of claim 6, wherein computing the voice coil resistance estimate further comprises:
   low pass filtering in parallel a voltage signal and a current signal received from the voice coil to the inaudible band using a second low pass filter; and
   blocking a DC offset included in the low pass filtered voltage and current signals in parallel to output an offset voltage signal and an offset current signal in parallel.

8. The method of claim 7, wherein computing the voice coil resistance estimate further comprises:
   converting the sample rate from the second sample rate to the first sample rate.

9. The method of claim 8, wherein computing the voice coil resistance estimate further comprises:
   calculating band energies for the offset voltage signal and the offset current signal in parallel, and
   computing the voice coil resistance estimate using the band energies for the offset voltage signal and offset current signal.

10. The method of claim 9, wherein calculating band energies comprises:
    calculating a root mean square (RMS) of the offset voltage signal and the offset current signal in parallel over a window, or
    calculating an average of band energies of the offset voltage signal and the offset current signal in parallel.

11. The method of claim 9, further comprising:
    adjusting a level of the audio signal based on the temperature estimate, wherein the speaker is a micro speaker.

12. A system of monitoring speaker temperature for speaker protection comprising:
    a limiter to receive an audio signal and adjust a level of the audio signal based on a temperature estimate;
    a pilot noise generator to generate an inaudible noise signal that is injected in the audio signal, wherein the pilot noise generator includes: a sequence generator to generate a noise signal that is a Maximal Length Sequence (MLS), and a first DC blocker to block a DC offset included in the MLS and to output a DC blocked MLS;
    a speaker including a voice coil, the speaker to output the audio signal including the inaudible noise signal; and
    a temperature measurer to compute
      a voice coil resistance estimate that estimates a resistance of the voice coil, wherein the voice coil resistance estimate changes while the speaker is being driven by the audio signal that includes the inaudible noise signal, and
      the temperature estimate based on the voice coil resistance estimate.

13. The system of claim 12, wherein the pilot noise generator further comprises:
    a first low pass filter to filter the DC blocked MLS to an inaudible band.

14. The system of claim 13, wherein the pilot noise generator further comprises:
    a first sample rate converter to convert a sample rate from a first sample rate to a second sample rate, wherein the first sample rate is a noise signal sample rate;
    a soft clipper to soft clip an output of the first low pass filter to limit a crest factor and output a softclipped output; and
    an amplifier to amplify the soft clipped output to generate the inaudible noise signal, wherein amplifying comprises multiplying the soft clipped output by an increasing function at a start of the soft clipped output and by a decreasing function at an end of the soft clipped output, the increasing function and the decreasing functions are linear or exponential.

15. The system of claim 14, wherein the temperature measurer further comprises:
    a second low pass filter to receive from the voice coil and filter a voltage signal and a current signal in parallel to the inaudible band; and
    a second DC blocker to block a DC offset included in the low pass filtered voltage and current signals in parallel and to output an offset voltage signal and an offset current signal in parallel.

16. The system of claim 15, wherein the temperature measurer further comprises:
- a second sample rate converter to convert the sample rate from the second sample rate to the first sample rate; and
- an energy calculator to calculate band energies for the offset voltage signal and the offset current signal in parallel, wherein to calculate band energies includes
- calculating a root mean square (RMS) of the offset voltage signal and the offset current signal in parallel over a window, or
- calculating an average of band energies of the offset voltage signal and the offset current signal in parallel.

17. The system of claim 16, wherein the temperature measurer further comprises:
- a resistance measurement calculator to compute the voice coil resistance estimate using the band energies of the offset voltage signal and offset current signal; and
- a temperature converter to compute the temperature estimate based on the voice coil resistance estimate.

18. A non-transitory computer-readable storage medium having stored thereon instructions, when executed by a processor, causes the processor to perform a method of monitoring speaker temperature for speaker protection comprising:
- generating an inaudible noise signal, wherein generating the inaudible noise signal includes: generating a noise signal, and blocking a DC offset included in the noise signal using a first DC blocker to output a DC blocked noise signal;
- injecting the inaudible noise signal in an audio signal;
- computing a voice coil resistance estimate that estimates a resistance of a voice coil of a speaker, wherein the voice coil resistance estimate changes while the speaker is being driven by the audio signal that includes the inaudible noise signal; and
- computing a temperature estimate based on the voice coil resistance estimate.

19. The non-transitory computer-readable storage medium of claim 18, wherein computing the voice coil resistance estimate further comprises:
- receiving a voltage signal and a current signal in parallel from the voice coil;
- low pass filtering the voltage signal and current signal in parallel to an inaudible band of the inaudible noise signal using a low pass filter; and
- blocking a DC offset included in the low pass filtered voltage and current signals in parallel to output an offset voltage signal and an offset current signal in parallel.

20. The non-transitory computer-readable storage medium of claim 19, wherein computing the voice coil resistance estimate further comprises:
- calculating band energies for the offset voltage signal and the offset current signal in parallel, wherein calculating band energies comprises:
  - calculating a root mean square (RMS) of the offset voltage signal and the offset current signal in parallel over a window, or
  - calculating an average of band energies of the offset voltage signal and the offset current signal in parallel.

21. The non-transitory computer-readable storage medium of claim 20, wherein computing the voice coil resistance estimate comprises:
- computing the voice coil resistance estimate using the band energies of the offset voltage signal and offset current signal.

22. The non-transitory computer-readable storage medium of claim 21, having stored thereon instructions, when executed by a processor, causes the processor to perform a method further comprising:
- adjusting a level of the audio signal based on the temperature estimate, wherein the speaker is a micro speaker.

23. The non-transitory computer-readable storage medium of claim 22, wherein injecting the inaudible noise signal in the audio signal further comprises:
- fading in the inaudible noise signal in a presence of audio; and
- fading out the inaudible noise signal in an absence of audio, wherein the fading in and fading out are linear or exponential.

\* \* \* \* \*